(12) United States Patent
DeKlerk et al.

(10) Patent No.: US 10,922,106 B2
(45) Date of Patent: Feb. 16, 2021

(54) SYSTEMS AND METHODS FOR PROVIDING GLOBALIZATION FEATURES IN A SERVICE MANAGEMENT APPLICATION INTERFACE

(71) Applicant: Cherwell Software, LLC, Colorado Springs, CO (US)

(72) Inventors: Adrian DeKlerk, Colorado Springs, CO (US); Arlen Sander Feldman, Colorado Springs, CO (US); Bryan Carey, Colorado Springs, CO (US)

(73) Assignee: Cherwell Software, LLC, Colorado Springs, CO (US)

( * ) Notice: Subject to any disclaimer, the term of this patent is extended or adjusted under 35 U.S.C. 154(b) by 88 days.

(21) Appl. No.: 16/101,117

(22) Filed: Aug. 10, 2018

(65) Prior Publication Data
US 2019/0050243 A1   Feb. 14, 2019

Related U.S. Application Data

(60) Provisional application No. 62/543,488, filed on Aug. 10, 2017.

(51) Int. Cl.
| | | |
|---|---|---|
| *G06F 9/451* | (2018.01) | |
| *G06F 40/58* | (2020.01) | |
| *G06F 40/263* | (2020.01) | |
| *G06F 16/21* | (2019.01) | |

(52) U.S. Cl.
CPC ............ *G06F 9/454* (2018.02); *G06F 9/453* (2018.02); *G06F 16/211* (2019.01); *G06F 40/263* (2020.01); *G06F 40/58* (2020.01)

(58) Field of Classification Search
CPC ................................. G06F 40/40; G06F 40/58
See application file for complete search history.

(56) References Cited

U.S. PATENT DOCUMENTS

| | | | | |
|---|---|---|---|---|
| 5,960,382 A | * | 9/1999 | Steiner | .................. G06F 40/45 704/2 |
| 2003/0135661 A1 | | 7/2003 | Barker et al. | |
| 2004/0268257 A1 | | 12/2004 | Mudusuru | |

(Continued)

FOREIGN PATENT DOCUMENTS

EP   3094071   11/2016

OTHER PUBLICATIONS

Search Report and Written Opinion received in PCT Patent Application No. PCT/US20181046279, dated Dec. 14, 2018, 14 pgs.

*Primary Examiner* — Shaun Roberts
(74) *Attorney, Agent, or Firm* — Eversheds Sutherland (US) LLP

(57) ABSTRACT

The disclosure can provide systems and methods for providing globalization features in a service management application interface. In one embodiment, a method can include receiving a definition comprising at least one function written in a first language; embedding, within the definition, the at least one function written in a second language translatable to the first language; retrieving the at least one function written in the second language translatable to the first language; and based at least in part on the at least one function written in the second language, converting a text string from the first language to the second language, wherein the text string comprises at least a portion of the definition.

20 Claims, 13 Drawing Sheets

(56) References Cited

U.S. PATENT DOCUMENTS

| | | | | |
|---|---|---|---|---|
| 2006/0173671 A1* | 8/2006 | Okawa | ................... | G06F 40/58 704/5 |
| 2008/0077384 A1 | 3/2008 | Agapi et al. | | |
| 2016/0337543 A1* | 11/2016 | Kano | ........................ | G06F 8/61 |
| 2017/0147560 A1 | 5/2017 | Pearson et al. | | |

* cited by examiner

SYSTEMS AND METHODS FOR PROVIDING GLOBALIZATION FEATURES IN A SERVICE MANAGEMENT APPLICATION INTERFACE

RELATED APPLICATION

The present application claims priority to U.S. Ser. No. 62/543,488, titled "Systems and Methods for Providing Globalization Features in a Service Management Application Interface," filed on Aug. 10, 2017, the contents of which are incorporated by reference.

BACKGROUND

In conventional application programs, only a single language may be used to interface with a user of the application. For example, an application program written for a user in the United States will usually be written in American English for the user to understand and to interact with the application program. In some conventional application programs, another application program, such as Google Translate, must be used in conjunction to convert the language of the first application program to a language a user in France, for example, can understand, such as French. In other conventional application programs, a remote language library or database may need to be accessed by the first application program to convert the language of the first application to a language, such as French, the user in France, for example, can understand. Each of the conventional application programs can be time consuming and/or cumbersome to use.

BRIEF DESCRIPTION OF DISCLOSURE

Certain embodiments of the disclosure are directed to systems and methods for providing globalization features in a service management application interface. One will recognize the applicability of the various embodiments of the disclosure to a service management application program as well as the service management application interface. Further, certain embodiments of the disclosure can be applied to all aspects of a service management application program as well as other types of application programs in other industries and industry segments. For example, certain embodiments of the disclosure can be applied to any number of other application programs such as application programs used in workflow management or customer service outside of information technology (IT) and/or information technology service management (ITSM).

In one embodiment, a computer-implemented method can be provided. The method can include receiving one or more text strings written in a first language. The method can further include receiving an indication of a second language to convert the one or more text strings to. Further, the method can include identifying, within the one or more text strings, a definition comprising at least one function written in the first language. Moreover, the method can include identifying, within the definition, at least one embedded function corresponding to the at least one function and written in the second language. Further, the method can include converting, based at least in part on the at least one embedded function written in the second language, the one or more text strings to translated text strings written in the second language and comprising at least a portion of the definition. Further, the method can include altering one more of a database schema, object definition, and/or object definition storage to facilitate localization and translation without manual input from a user. Moreover, the method can include displaying the translated text strings.

In another embodiment, a computer-implemented method can be provided. The method can include receiving a definition comprising at least one function written in a first language. The method can also include embedding, within the definition, the at least one function written in a second language translatable to the first language. Further, the method can include retrieving the at least one function written in the second language translatable to the first language. Moreover, the method can include, based at least in part on the at least one function written in the second language, converting a text string from the first language to the second language, wherein the text string comprises at least a portion of the definition.

In another embodiment, a system can be provided. The system can include a server device having at least one processor configured to execute computer-readable instructions stored in the memory. The computer-readable instructions can be operable to receive one or more text strings written in the first language; receive an indication of a second language to convert the one or more text strings to; identify within the one or more text strings, a definition comprising at least one function written in the first language; identify, within the definition, at least one embedded function corresponding to the at least one function and written in the second language; convert, based at least in part on the at least one embedded function written in the second language, the one or more text strings to translated text strings written in the second language and comprising at least a portion of the definition; alter one more of a database schema, object definition, and/or object definition storage to facilitate localization and translation without manual input from a user; and display the translated text strings.

In yet another embodiment, a system can be provided. The system can include a server device having at least one processor configured to execute computer-readable instructions stored in the memory. The computer-readable instructions can be operable to receive a definition comprising at least one function written in a first language; embed, within the definition, the at least one function written in a second language translatable to the first language; retrieve the at least one function written in the second language translatable to the first language; and based at least in part on the at least one function written in the second language, convert a text string from the first language to the second language, wherein the text string comprises at least a portion of the definition.

In another embodiment, a computer-readable medium comprising a memory with one or more computer-executable instructions can be provided. The computer-executable instructions can be operable to receive one or more text strings written in the first language; receive an indication of a second language to convert the one or more text strings to; identify within the one or more text strings, a definition comprising at least one function written in the first language; identify, within the definition, at least one embedded function corresponding to the at least one function and written in the second language; convert, based at least in part on the at least one embedded function written in the second language, the one or more text strings to translated text strings written in the second language and comprising at least a portion of the definition; alter one more of a database schema, object definition, and/or object definition storage to facilitate localization and translation without manual input from a user; and display the translated text strings.

In another embodiment, a computer-readable medium comprising a memory with one or more computer-executable instructions can be provided. The computer-executable instructions can be operable to: receive a definition comprising at least one function written in a first language; embed, within the definition, the at least one function written in a second language translatable to the first language; retrieve the at least one function written in the second language translatable to the first language; and based at least in part on the at least one function written in the second language, convert a text string from the first language to the second language, wherein the text string comprises at least a portion of the definition.

Figure 1:
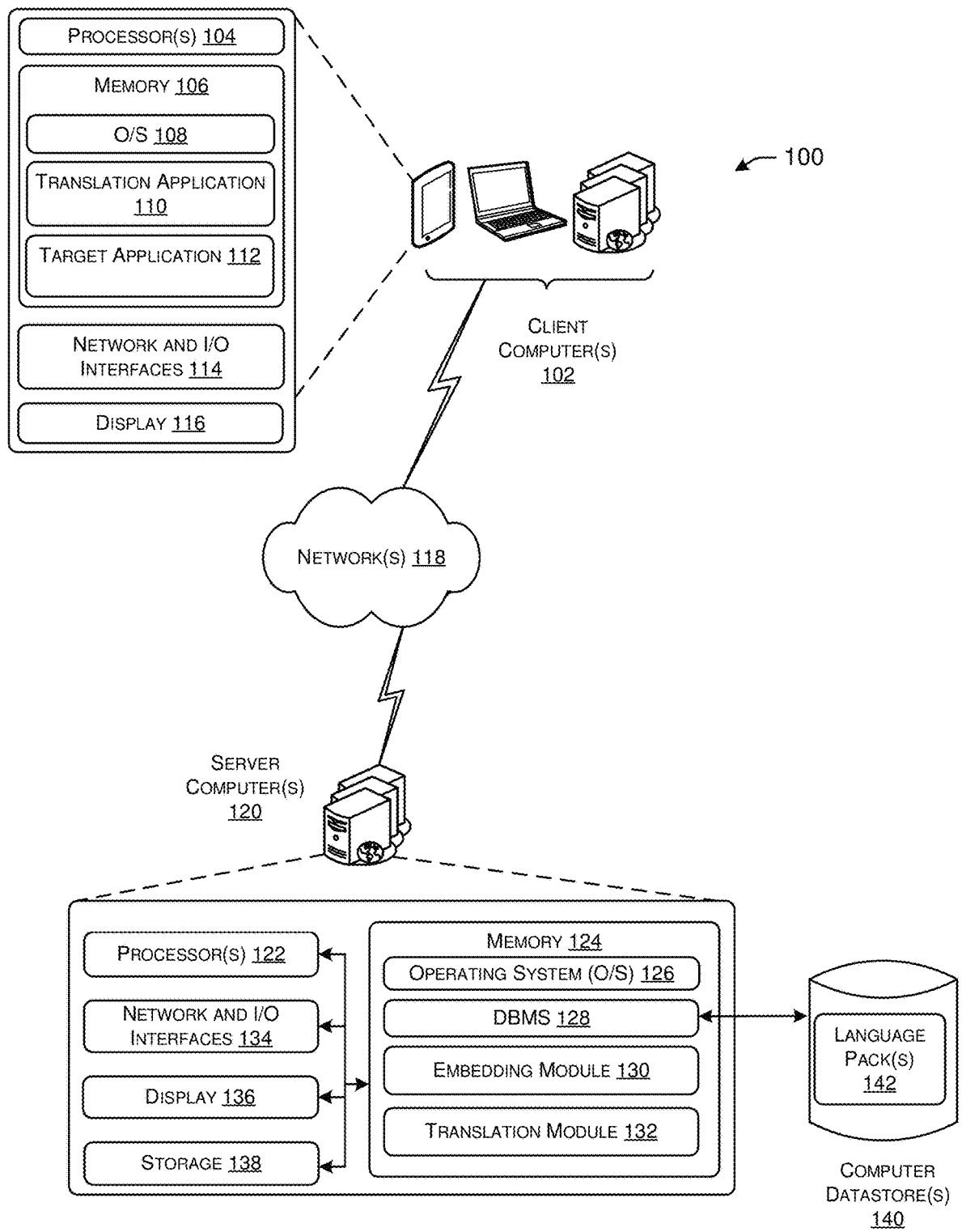
FIG. 1 illustrates an example architectural system according to at least one embodiment of the disclosure.

The detailed description is set forth with reference to the accompanying drawings. The use of the same reference numerals indicates similar or identical components or elements; however, different reference numerals may be used as well to indicate components, operations, or elements which may be similar or identical. Various embodiments of the disclosure may utilize elements, operations, and/or components other than those illustrated in the drawings, and some elements and/or components may not be present in various embodiments. Depending on the context, singular terminology used to describe an element, operation, or a component may encompass a plural number of such elements, operations, or components and vice versa.

DETAILED DESCRIPTION

Certain embodiments of the disclosure are directed to systems and methods for providing globalization features in a service management application interface.

In one embodiment of the disclosure, when a user wants to utilize an application program (also known herein as a target application program, such as IT Incident Management provided by Cherwell Software, LLC, in another language, for instance, French, some or all of the following operations can be performed by an administrator operating a system, such as 100 in FIG. 1, according to certain embodiments of the disclosure.

An administrator adds a new language to the system. That is, the administrator can upload a suitable language pack or data file to the system, wherein the language pack or data file can include language translations or strings that enable support translations from one language to the new desired language, such as from English to French. For instance, the language pack or data file can include a set of strings in a first language or source language, such as English, and these strings include corresponding strings translated to a second language, target language, or desired language, such as French.

The system can analyze the application program to identify or otherwise determine some or all translatable strings associated with the application program. That is, the system can analyze the IT Incident Management application program, and extract some or all translatable strings from the IT Incident Management application program. The translatable strings can include some or all definitions that are directly and/or indirectly related to the IT Incident Management application program.

For each of the identified and/or determined translatable strings, the system can, utilizing the language pack or data file, translate the translatable strings from a first language to a second language. That is, using a suitable language pack or data file with a set of strings in English and corresponding strings in French, the system can translate the identified or determined strings associated with the IT Incident Management application program from English into French. In certain embodiments, translation or conversion from a first language to a second language can be performed using an external translation computer service, such as Google Translate, or by an external translation agency. In any instance, the translations exist in a separate definition (language pack bundle) in the system and are not embedded in the definitions associated with the IT Incident Management application program. In this manner, the language pack bundle definition can permit a host entity to collaborate with one or more partners and/or customers to share and collaborate in creating one or more translation dictionaries via a suitable application program or service, such as mApps provided by Cherwell Software, LLC.

After the system translates the translatable strings to the second language, the administrator can embed the translated strings into one or more definitions. That is, once all the identified or determined translatable strings have been translated from English to French, the administrator can utilize the translated strings in the definitions associated with the IT Incident Management application program, therefore embedding the translated strings within a corresponding and relevant definition. Note that each definition contains the translation for the second language, target language, or desired language, and no subsequent access to an external entity or data file is needed to facilitate or complete the translation. That is, the system can alter one more of a database schema, object definition, and/or object definition storage to facilitate localization and translation for the second language without subsequent manual input from a user;

After the translations are embedded in the definitions, the definitions can be used by an end user to access any number of application programs, and elect to use a second or desired language. For example, an end user implementing a Cultures feature provided by Cherwell Software, LLC, can log into the IT Incident Management application program and elect to use the French language while utilizing the application program. Each definition, when used in the application program, can, based on its embedded translations, determine whether suitable translations exist for the second or desired language, such as French, and the application program can serve the translations accordingly.

In one embodiment, unique self-referential globalization tools can be used to translate text, referred to as "strings," into one or more languages. This can permit users to use a single application program to view the same data in multiple languages. One can translate strings for all content, for specific storage objects and their associations, lookup table data, portal content and portal platform strings, platform strings, and portal resource strings, including, but not limited to, dashboards, expressions, one-steps, fields within tables, toolbars, menus, errors, user-defined headers and footers, menu items, controls, and tool tips. As used herein, a "definition" can be a system entity that makes up a content object, such as a business object, form, grid, relationship, or search group.

For example, in one use case for certain embodiments of the disclosure, a customer may want to use an application program in a different language, such as French, than the language the application program was originally written for, such as English. The globalization tools described herein can be used to translate some or all of the text strings in the application program (referred to herein as a target application program) from English to French, such that the customer can execute the target application program and view some or all of the interfaces output from the application in French rather than English.

In certain embodiments, the globalization tools can be used to translate, on a global, bulk, or relatively large scale, most or all of the text strings in the target application program from a first language to a second language. In certain other embodiments, after a global or relatively large scale translation has been performed, the globalization tools can be used to translate, on a day-to-day basis, some or a portion of the text strings in the target application program from a first language to a second language, where the target application program is maintained in the second language and some or all of the remaining untranslated text strings can be translated from a first language to a second language, and translated text strings can be re-translated or otherwise correctly translated from the first language to the second language.

In another example use case for certain embodiments of the disclosure, the globalization tools can be used to translate, on a component-by-component scale, most or all of the text strings in a first component of a suite of programs, such as an incident management component of a target application program, from a first language to a second language. Next, the globalization tools can be used to translate most or all of the text strings in a second component of a suite of programs, such as a change management component of the target application, from a first language to a second language, and so on, until some or all of the text strings of the components of a suite of programs are translated.

According to one embodiment of the disclosure, a computer-implemented method can be provided. The method can include receiving one or more text strings written in a first language, such as English (United States), also designated as "en-US". The method can include receiving an indication of a second language, such as French Canadian, also designated as "fr-CA" to convert the one or more text strings to. The method can further include identifying, within the one or more text strings, a definition comprising at least one function written in the first language. The method can include identifying, within the definition, at least one embedded function corresponding to the at least one function and written in the second language. The method can also include converting, based at least in part on the at least one embedded function written in the second language, the one or more text strings to translated text strings written in the second language and comprising at least a portion of the definition. The method can also include altering one more of a database schema, object definition, and/or object definition storage to facilitate localization and translation without manual input from a user. The method can include displaying the translated text strings.

In certain embodiments, the at least one embedded function corresponding to the at least one function can be written in multiple languages.

According to yet another embodiment of the disclosure, another computer-implemented method can be provided. The method can include receiving a definition comprising at least one function written in a first language. The method can further include embedding, within the definition, the at least one function written in a second language translatable to the first language. The method can also include retrieving the at least one function written in the second language translatable to the first language. The method can include based at least in part on the at least one function written in the second language, converting a text string from the first language to the second language, wherein the text string comprises at least a portion of the definition.

In certain embodiments, the at least one function embedded within the definition can be written in multiple languages, each translatable to the first language.

Embodiments of the disclosure now will be described more fully hereinafter with reference to the accompanying drawings, in which certain embodiments are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Example System Architecture

FIG. 1 illustrates an example architectural system according to at least one embodiment of the disclosure. As shown in FIG. 1, in certain embodiments, certain operations, such as some or all of those illustrated in the process flows of FIGS. 2 and 3, may be performed by the system 100 shown in FIG. 1. In some embodiments, a computer such as 102 shown in FIG. 1 can implement certain operations and/or may work in conjunction and/or separately from the system 100 shown in FIG. 1 to implement certain operations, for example, as illustrated in the process flows of FIGS. 2 and 3.

As shown in FIG. 1, the system 100 may include one or more computers 102, client devices, and/or servers 120. In certain embodiments, communications between the computers 102, the client devices, and/or servers 120 may be facilitated via one or more suitable networks 118, such as the Internet, etc.

With continued reference to FIG. 1, the computers 102, client devices, and/or servers 120 may obtain and store information associated with a target application program 112 to be translated as well as one or more other application programs, such as 110, or modules 130, 132 executing on the computers 102, client devices, and/or servers 120. For example, application program data from a target application program 112 such as an information technology service management (ITSM) program may be stored by at least one computer 102, client device, and/or server 122 in memory 106, 124 or in one or more associated databases or data stores, such as 138, 140. Each respective memory 106, 124 may also store one or more program modules utilized by the computer or client device 102, such as an operating system (OS) 108, translation application 110, embedding module 130, and translation module 132. Further, each respective memory 106, 124 and database and/or data store 140 may also store or otherwise support storing, as needed, database schema, object definition, and/or object definition storage. The memory 106, 124 and database and/or data store 140 may also contain data files, such as one or more language packs 142. A language pack 142 can be a data file containing one or more text strings including definitions and functions written in a source or first language and translated strings in a target language or second language. Multiple language packs can be stored, wherein each language pack can be written in a different language from the others. In some embodiments, a language pack may include one or more text strings including definitions and functions written in multiple languages. Strings and translated strings in a language pack can be edited and stored as needed. As desired, application program data and associated information may be obtained from a wide variety of suitable sources, such as the computers 102, client devices, servers 120, and/or databases or data stores 140 and any number of data files can be obtained, collected, received, or retrieved. Additionally, as desired, the computers 102, client devices, servers 120, and/or databases or data stores 140 can provide information specific to a particular request based on one or more indicated preferences.

In one embodiment, globalization tools or a translation application program 110 can receive one or more text strings of a target application program 112. The translation application program 110 can utilize any number of databases, data stores, such as 140, and/or language services to process the one or more received text strings to identify and embed, within each definition within the one or more text strings, any number of functions written in one or more different languages. When a particular language is identified at a later time, an embedded function in the particular language can be identified, and one or more text strings can be converted to the particular language, wherein the one or more text strings can include at least a portion of the definition. The conversion of the one or more text strings from a first language to a second language can be performed by one or more of the processors 104, 122 referencing at least one language pack, such as 142, stored in a data store 140 or similar data structure. The translated text strings for the target application program can be stored by the translation application 110, embedding module 130, and/or translation module 132

With continuing reference to FIG. 1, any number of computers 102, client devices, servers 120, and/or databases or data stores 140 may be provided. A computer 102, client device, and/or server 120 may include any number of processors. Such devices may include and/or incorporate a server computer, a personal computer, one or more networked computing devices, an application-specific circuit, a minicomputer, a microcontroller, and/or any other processor-based device and/or combination of devices.

With reference to FIG. 1, each of the computers 102, client devices, and/or servers 120 may include one or more memory devices (generally referred to as memory) 106, 124, one or more input/output ("I/O") interface(s) 114, 134, and/or one or more communication connections. The communication connections may interface with a database and/or data store, such as 140, which may contain one or more data files, such as which may include language packs 142 and/or application program data. For example, the data files may include information associated with one or more computers or client devices 102, information associated with one or more application programs or modules, rules and/or parameters, etc.

The memory 106, 124 may be any computer-readable medium, coupled to the one or more processors, such as random access memory ("RAM"), read-only memory ("ROM"), and/or removable storage devices. Each respective memory 106, 124 may store one or more program modules utilized by the computer or client device 102, such as an operating system (OS) 108, translation application 110, target application 112, embedding module 130, and translation module 132.

Certain embodiments may be provided as a computer program product including a non-transitory machine-readable storage medium having stored thereon instructions (in compressed or uncompressed form) that may be used to program a computer (or other electronic device) to perform processes or methods described herein. For example, certain embodiments may be provided as a computer program product or group of products that may be executed by the computers, client devices, servers, or other suitable computing systems. The machine-readable storage medium may include, but is not limited to, hard drives, floppy diskettes, optical disks, CD-ROMs, DVDs, read-only memories ("ROMs"), random access memories ("RAMs"), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not include, but are not limited to, signals that a computer system or machine hosting or running a computer program can be configured to access, including signals downloaded through the Internet or other networks. For example, distribution of software may be Internet download.

With reference to the contents of the memory, the data files may include any suitable data that facilitates the operation of the computer and/or interaction of the computer with one or more other components of the system.

The OS 108 may be any suitable module that facilitates the general operation of the computer, as well as the execution of other application program modules.

The computers or client devices, such as 102, may include any computing device such as a personal computer, laptop, and/or tablet. The computer or client device 102 may include one or more processors. The one or more processors may be implemented as appropriate in hardware, software, firmware, or combinations thereof. Software or firmware implementations of the one or more processors may include computer-readable or machine-readable instructions written in any suitable programming language to perform the various functions described. The computers or client devices, in addition to having one or more processors, may further include one or more memory devices (generally referred to as memory) 106, one or more input/output ("I/O") interface(s) 114, and/or one or more communication connections. The communications connections may interface with the network 118 to transmit information.

The memory 106, 124 may be any computer-readable medium, coupled to the one or more processors of the computer and/or client device 102, or server 120, such as random access memory ("RAM"), read-only memory ("ROM"), and/or removable storage devices. The memory 106 may store one or more program modules utilized by the computer and/or client device 102, such as an operating system (OS) 108, translation application 110, target application 112, embedding module 130, and translation module 132.

The one or more I/O interfaces 114 may facilitate communication between the computer, client device 102 and one or more input/output devices. For example, one or more user interface devices can include, but are not limited to, a display 116, a keypad, a keyboard, a printer, a messaging device, an email appliance, a touch screen display, a gesture recognition and/or capture device, a microphone, a speaker, a mouse, or any other similar device that can facilitate user interaction. The one or more network and/or communication connections may facilitate connection of the computer or client device 102 to any number of suitable networks, for example, the one or more network(s) illustrated as 118 in FIG. 1. In this regard, the computer or client device 102, and server 120 may receive and/or communicate information to other components of the system.

With continued reference to FIG. 1, any number of computer or client devices 102, and server 120 may be included in the system 100. A computer or client device 102, and server 120 may be configured to access one or more application programs hosted by the computers or client devices 102, or server 120 in order to review and/or manipulate information. In certain embodiments, a computer or client device 102, or server 120 may include similar components as those discussed above for the computer. For example, a computer or client device 102, or server 120 may include any number of processors, memories, I/O interfaces, and/or network/communication interfaces.

A wide variety of suitable networks (which may be the same or separate networks) and/or communication channels may be utilized to facilitate communications between the client devices, the computers and/or other components of the system. These networks may include, but are not limited to, one or more telecommunication networks, cellular networks, wide area networks (e.g., the Internet), and/or local area networks. Various methodologies as described herein may be practiced in the context of distributed computing environments. It will also be appreciated that the various networks may include a plurality of networks, each with devices such as gateways and routers for providing connectivity between or among networks. Additionally, instead of, or in addition to, a network, dedicated communication links may be used to connect various devices in accordance with an example embodiment.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the disclosure should not be construed as being limited to any particular operating environment, system architecture, or device configuration.

Example Processes

Figure 2:
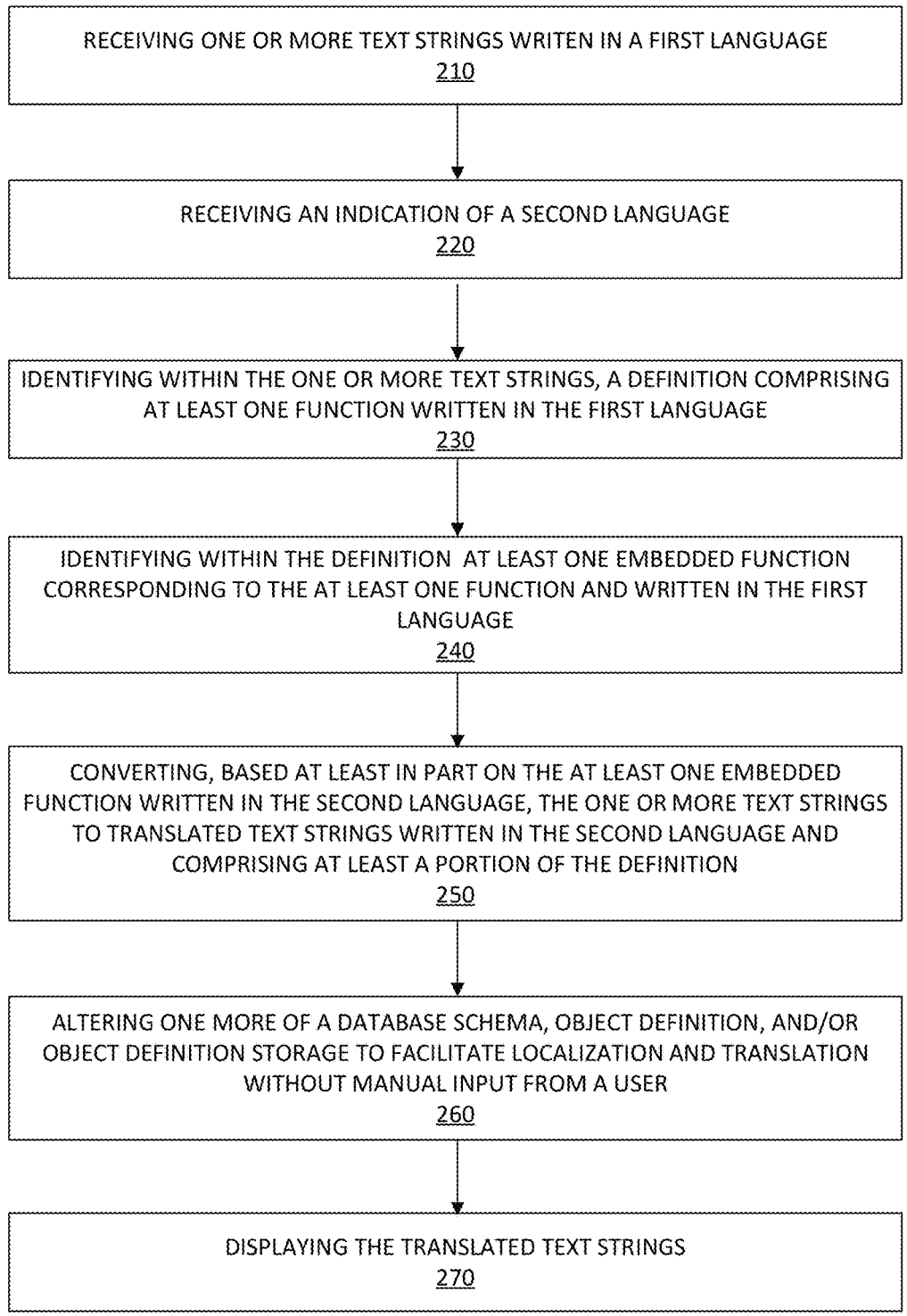
FIG. 2 illustrates an example process flow in accordance with at least one embodiment of the disclosure.
Figure 3:
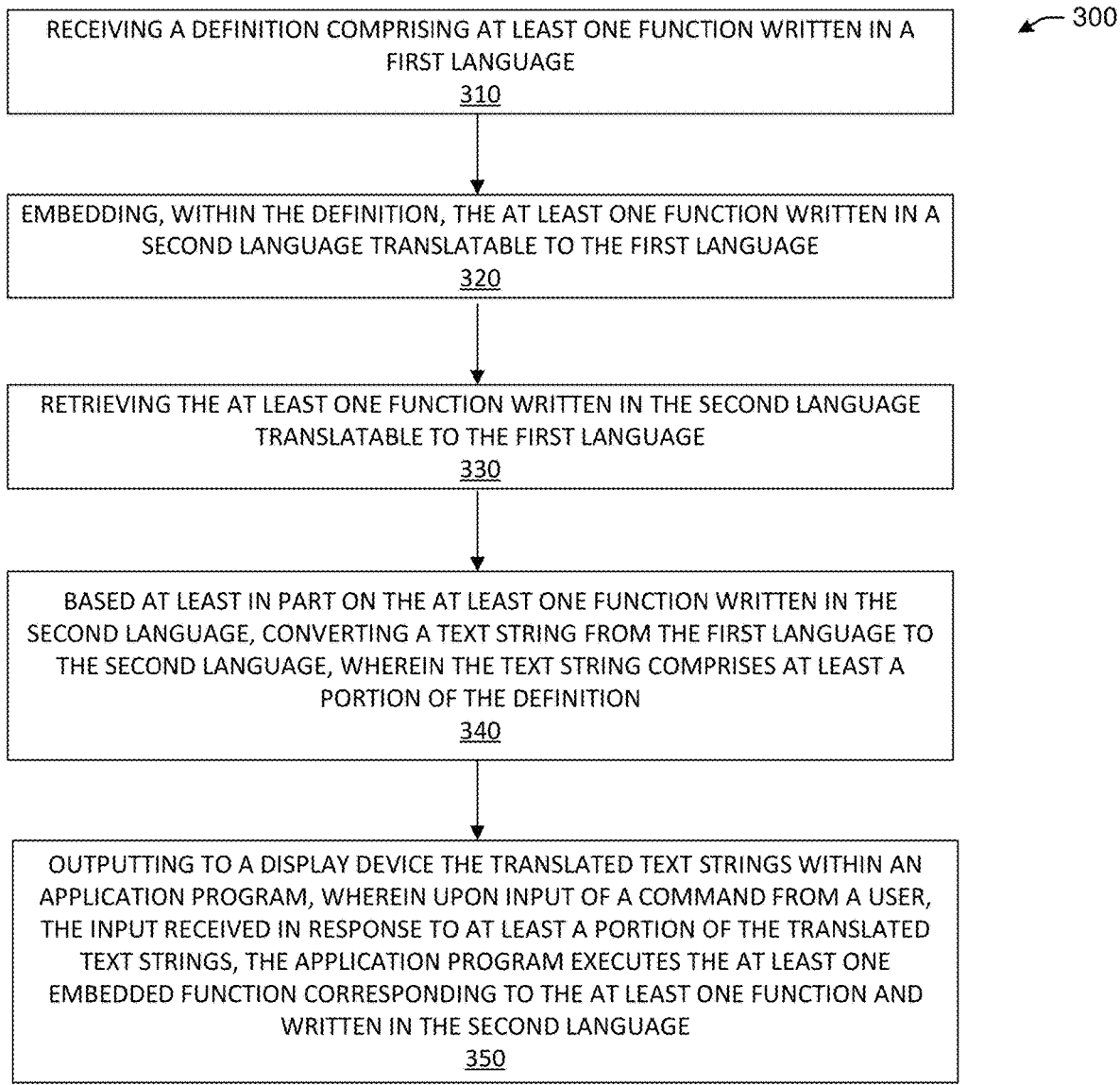
FIG. 3 illustrates an example process flow in accordance with at least one embodiment of the disclosure.

FIGS. 2 and 3 illustrate flow diagrams of example processes according to certain embodiments of the disclosure. FIGS. 4-13 illustrate several example user interfaces and features that can be implemented by the system of FIG. 1 and/or some or all of the processes described in FIGS. 2 and 3.

FIG. 2 illustrates an example process according to at least one embodiment of the disclosure. The process or method 200 begins at block 210.

At block 210, one or more text strings written in the first language can be received. By reference to FIG. 1, the translation application 110 of a computer or client device 102, or a translation module 132 of a server device 120, can receive or otherwise obtain one or more text strings in a first language, such as English, from a target application 112.

Block 210 is followed by block 220, in which an indication of a second language to convert the one or more text strings to can be received. The translation application 110 of a computer or client device 102, or the translation module 132 of a server device 120, can receive an indication of a second language, such as French, to convert the one or more text strings.

In certain aspects of an embodiment, the first language can include English, and the second language can include a language other than English.

In certain aspects of an embodiment, the converting can include receiving an indication from a user or application program that the one or more text strings are to be translated from the first language to the second language.

Block 220 is followed by block 230, in which within the one or more text strings, a definition comprising at least one function written in the first language can be identified. The translation application 110 of a computer or client device 102, or a translation module 132 of a server device 120, can identify within the one or more text strings, a definition comprising at least one function written in the first language, such as English.

Block 230 is followed by block 240, in which within the definition, at least one embedded function corresponding to the at least one function and written in the second language, can be identified. The translation application 110 of a computer or client device 102, or a translation module 132 of a server device 120, can identify within the definition, at least one embedded function corresponding to the at least one function and written in the second language, such as French.

Block 240 is followed by block 250, in which based at least in part on the at least one embedded function written in the second language, the one or more text strings to translated text strings written in the second language and comprising at least a portion of the definition can be converted. The translation application 110 of a computer or client device 102, or a translation module 132 of a server device 120, can convert, based at least in part on the at least one embedded function written in the second language, the one or more text strings to translated text strings written in the second language, such as French, and comprising at least a portion of the definition.

In certain aspects of an embodiment, the method 200 can include translating the at least one function from the first language to the second language, and embedding, within the definition, the at least one function translated to the second language. The translation application 110 of a computer or client device 102, or the translation module 132 and/or embedding module 130 of a server device 120, can translate the at least one function from the first language to the second language, and can embed, within the definition, the at least one function translated to the second language.

Block 250 is followed by block 260, in which one more of a database schema, object definition, and/or object definition storage can be altered to facilitate localization and translation without manual input from a user. The translation application 110 of a computer or client device 102, or a translation module 132 of a server device 120, can alter one more of a database schema, object definition, and/or object definition storage to facilitate localization and translation without manual input from a user.

In certain aspects of an embodiment, the altering can include storing one or more translated text strings in the second language in the database schema, object definition, or object definition storage. The translation application 110 of a computer or client device 102, or a translation module 132 of a server device 120, can store one or more translated text strings in the second language in the database schema, object definition, or object definition storage in memory 106, 124 and/or a data store 140 or other data storage device.

In certain aspects of an embodiment, the method 200 can include accessing the database schema, object definition, or object definition storage to obtain the one or more translated text strings in the second language. The translation application 110 of a computer or client device 102, or a translation module 132 of a server device 120, can access the memory 106, 124 and/or a data store 140 or other data storage device to obtain the database schema, object definition, or object definition storage and the one or more translated text strings in the second language.

Block 260 is followed by block 270, in which the translated text strings are displayed. The translation application 110 of a computer or client device 102, or a translation module 132 of a server device 120, can display the translated text strings on an output device, such as display 116 or 136.

In one aspect of an embodiment, the displaying can include outputting to a display device the translated text strings within an application program, wherein upon input of a command from a user, the input received in response to at least a portion of the translated text strings, the application program executes the at least one embedded function corresponding to the at least one function and written in the second language. The translation application 110 of a computer or client device 102, or a translation module 132 of a server device 120, can output to a display device, such as 116, 136, the translated text strings within the target application program 112, wherein upon input of a command from a user, such as from a keyboard in communication via the I/O interfaces 114, 134, the input received in response to at least a portion of the translated text strings, the target application program 112 can execute the at least one embedded function corresponding to the at least one function and written in the second language.

In at least one aspect of an embodiment, the at least one function can facilitate a physical action by a computer or client device, such as 102, or server device 120, executing the target application program 112, the physical action including at least one of the following: printing a document, or transmitting a message or an email.

The method 200 can end after block 270.

FIG. 3 illustrates another example process or method 300 according to an embodiment of the disclosure. The method 300 starts at block 310, in which a definition including at least one function written in a first language can be received. By reference to FIG. 1, the translation application 110 of a computer or client device 102, or a translation module 132 of a server device 120, can receive or otherwise obtain a definition including at least one function written in a first language, such as English, from a target application 112.

Block 310 is followed by block 320, in which within the definition, the at least one function written in a second language translatable to the first language can be embedded. By reference to FIG. 1, the translation application 110 of a computer or client device 102, or a translation module 132 and/or embedding module 130 of a server device 120, can embed, within the definition, the at least one function written in a second language translatable to the first language.

In certain aspects of an embodiment, the first language can include English, and the second language can include a language other than English.

In certain aspects of an embodiment, the method 300 can include receiving an indication from a user or application program that the one or more text strings are to be translated from the first language to the second language.

Block 320 is followed by block 330, in which the at least one function written in the second language translatable to the first language can be retrieved. The translation application 110 of a computer or client device 102, or the translation module 132 and/or embedding module 130 of a server device 120, can retrieve the at least one function written in the second language translatable to the first language.

Block 330 is followed by block 340, in which based at least in part on the at least one function written in the second language, a text string can be converted from the first language to the second language, wherein the text string can include at least a portion of the definition. The translation application 110 of a computer or client device 102, or the translation module 132 and/or embedding module 130 of a server device 120, can translate the at least one function from the first language to the second language, and can convert, based at least in part on the at least one function written in the second language, a text string from the first language to the second language, wherein the text string can include at least a portion of the definition.

In certain aspects of an embodiment, the method 300 can include storing one or more translated text strings in the second language in the database schema, object definition, or object definition storage. The translation application 110 of a computer or client device 102, or a translation module 132 of a server device 120, can store one or more translated text strings in the second language in the database schema, object definition, or object definition storage in memory 106, 124 and/or a data store 140 or other data storage device.

In certain aspects of an embodiment, the method 300 can include accessing the database schema, object definition, or object definition storage to obtain the one or more translated text strings in the second language. The translation application 110 of a computer or client device 102, or a translation module 132 of a server device 120, can access the memory 106, 124 and/or a data store 140 or other data storage device to obtain the database schema, object definition, or object definition storage and the one or more translated text strings in the second language.

In one aspect of an embodiment, the method 300 can include outputting to a display device the translated text strings within an application program, wherein upon input of a command from a user, the input received in response to at least a portion of the translated text strings, the application program executes the at least one embedded function corresponding to the at least one function and written in the second language. The translation application 110 of a computer or client device 102, or a translation module 132 of a server device 120, can output to a display device, such as 116, 136, the translated text strings within the target application program 112, wherein upon input of a command from a user, such as from a keyboard in communication via the I/O interfaces 114, 134, the input received in response to at least a portion of the translated text strings, the target application program 112 can execute the at least one embedded function corresponding to the at least one function and written in the second language.

The method 300 can end after block 340.

Figure 4:
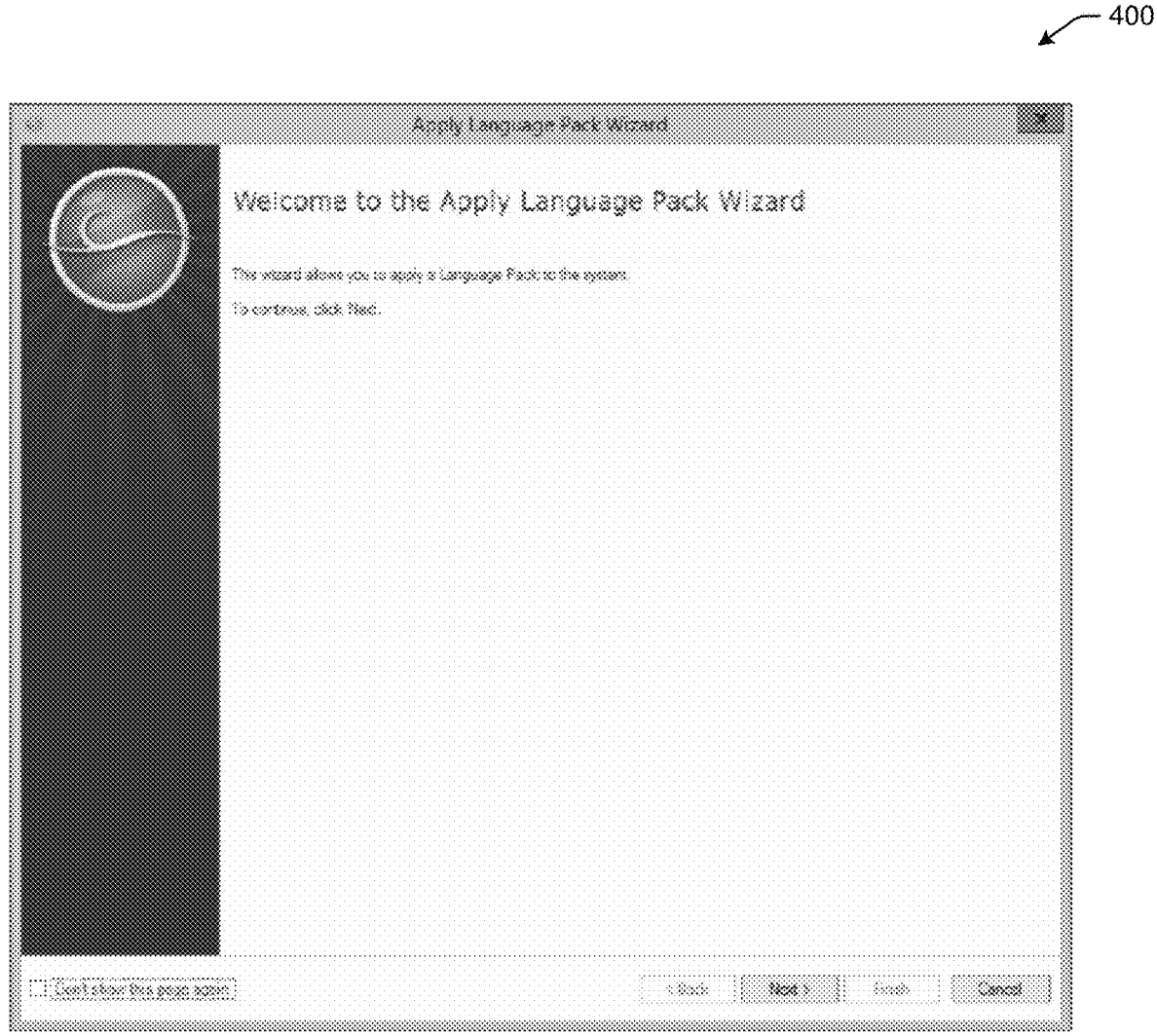
FIGS. 4-14 illustrate example associated user interfaces and features according to certain embodiments of the disclosure.

FIGS. 4-13 illustrate various user interfaces and features according to certain embodiments of the disclosure. In FIG. 4, an introduction page 400 can generated by a translation application program and presented to a user to prompt the user to apply a language pack to a particular target application program. For example, once a user has selected a desired second language to translate a target application program to from an initial first language, the user can apply a suitable language pack to the target application program.

Figure 5:
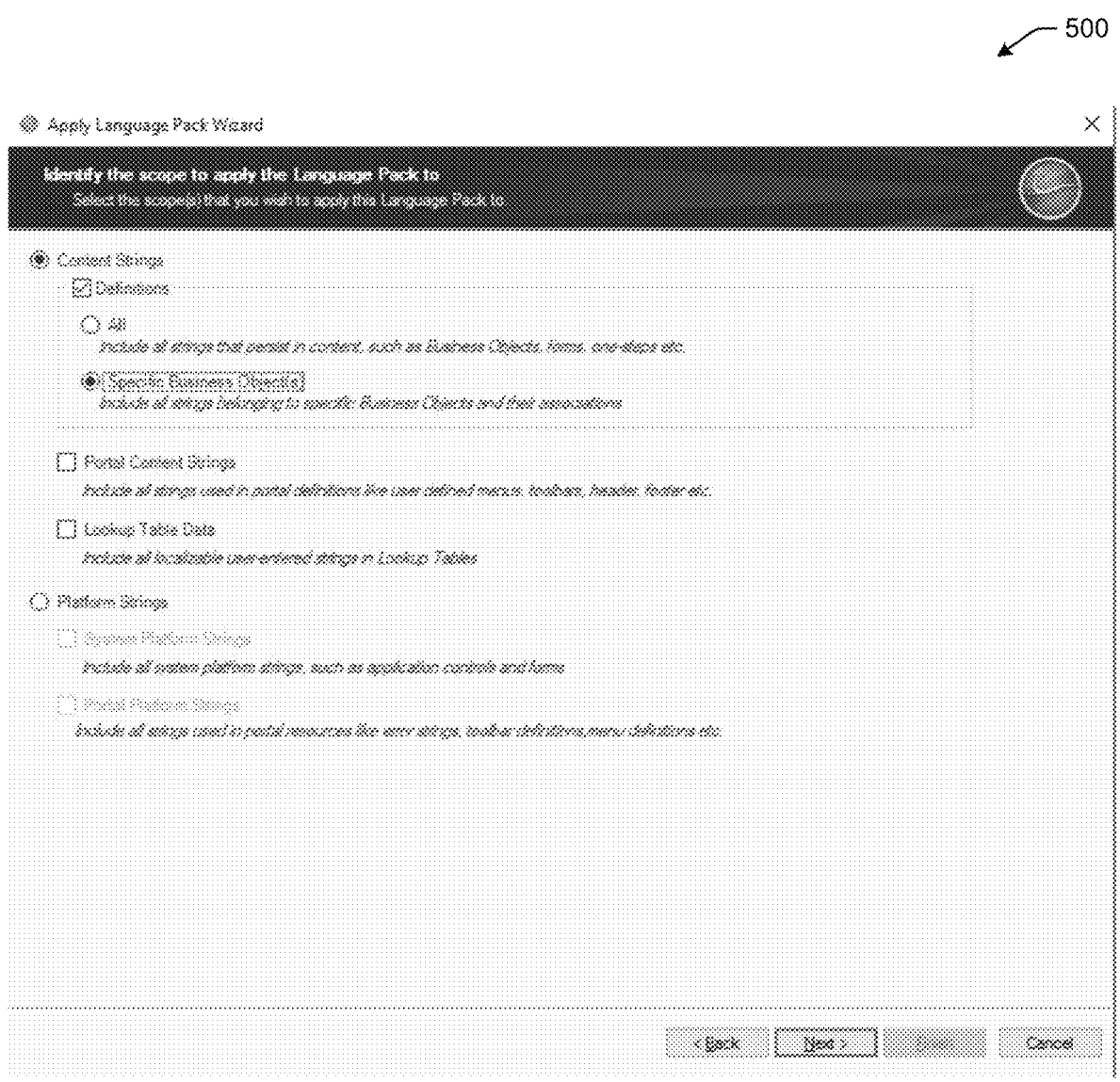

In FIG. 5, the user can be prompted on a page 500 generated by a translation application program to select one or more text strings to apply the language pack to, or to translate, the text strings from one language to another language. In this example, the user can be prompted to select system strings, all content, specific business objects, forms, portal content strings, lookup table data, portal strings, platform strings, application controls, error strings, toolbar definitions, menu definitions, and/or portal resources. Optionally, the user can be prompted, in certain embodiments, to select an external mAPP-type file.

Figure 6:
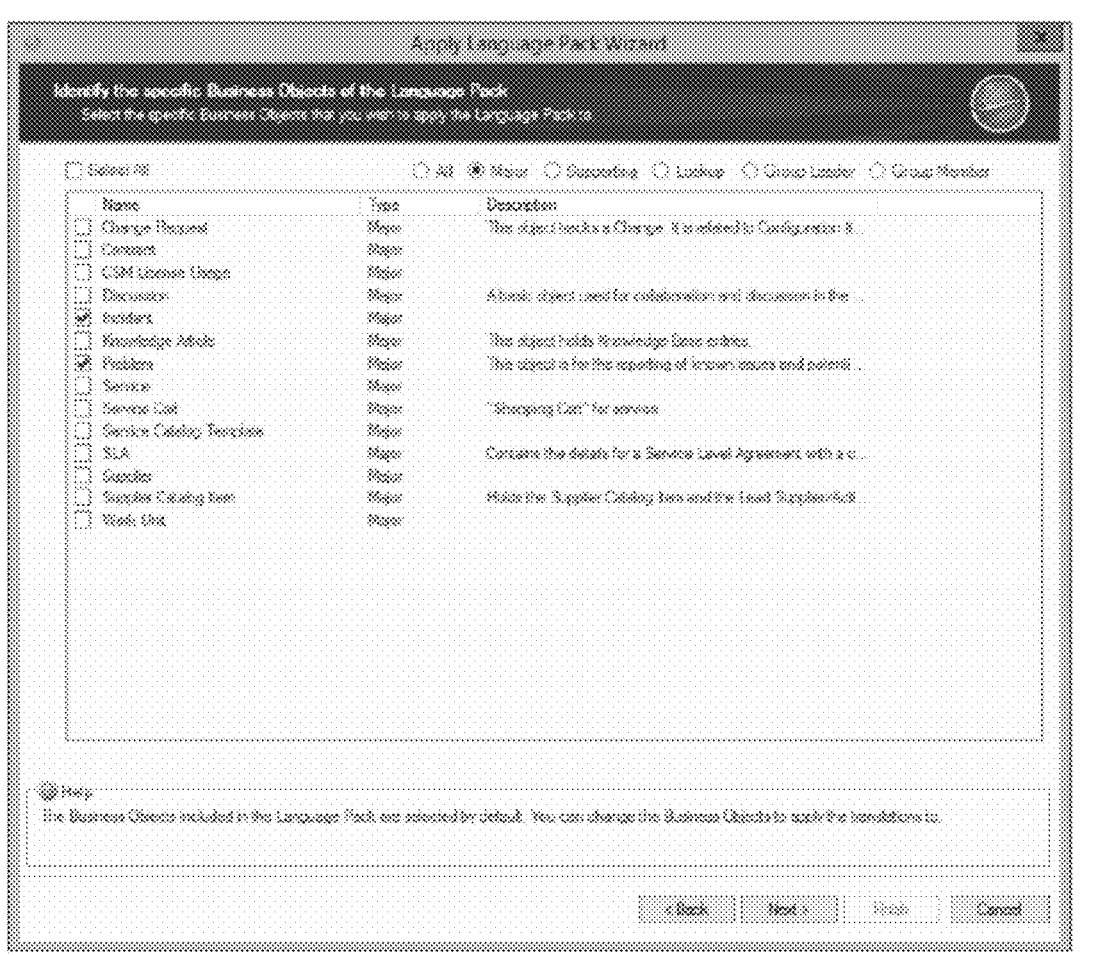

In FIG. 6, a translation application program can generate, for example, a page 600 to selectively identify specific business objects in the target application program to apply the language pack to. In the example shown, a column of "Major" business object types can be output with a corresponding description of the business object and a check box for the user to select or deselect each business object. Other business object types including, but not limited to, All, Supporting, Lookup, Group Leader, and Group Member can be selected by the user, and the translation application program can generate another page displaying certain business objects in the target application program to apply the language pack to. In this page 600, any number of business objects can be selected for the translation application program to apply translations to the corresponding text strings.

Figure 7:
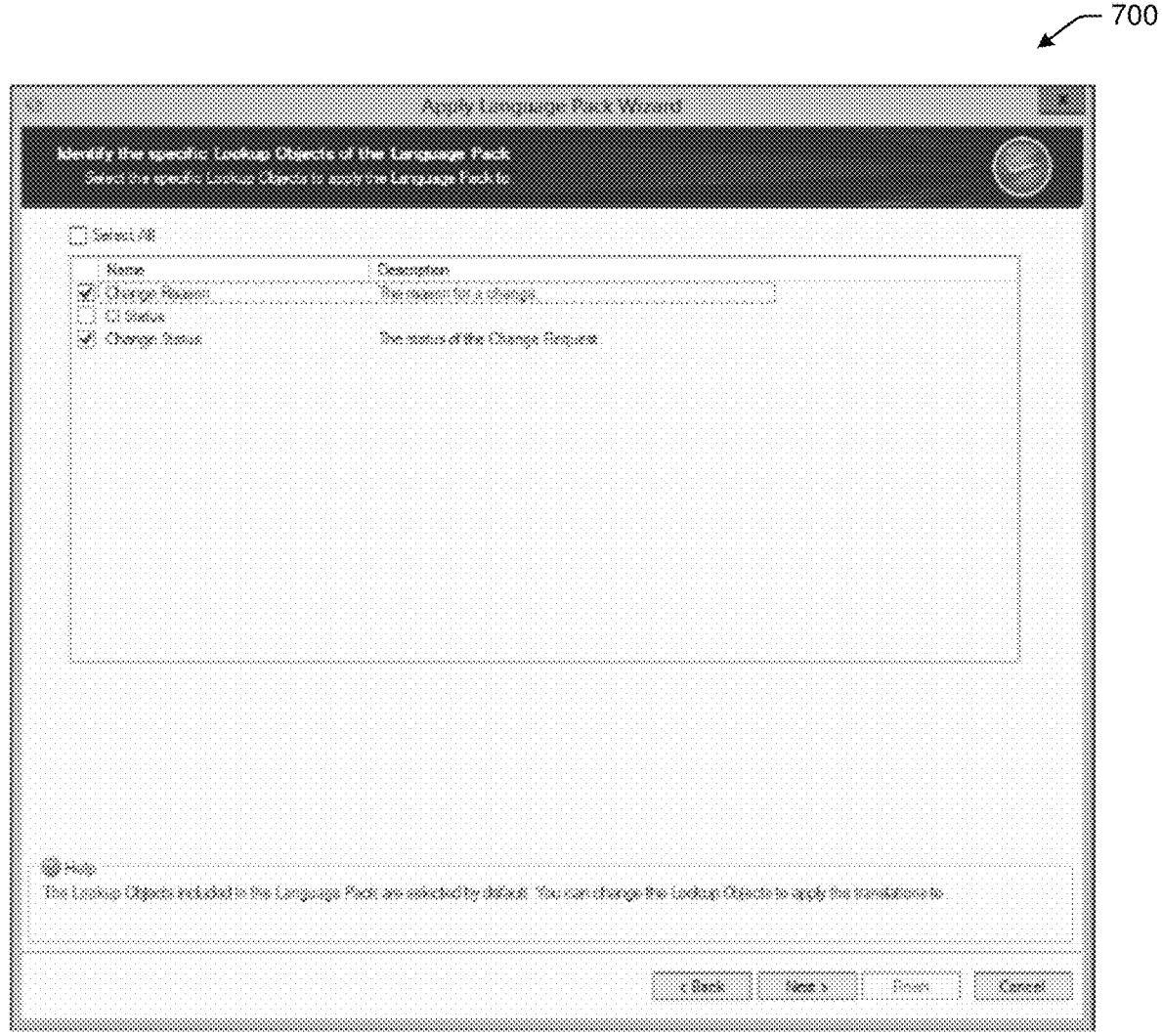

In FIG. 7, a translation application program can generate, for example, a page 700 to selectively identify specific lookup objects in the target application program to apply the language pack to. In the example shown, a column of "Lookup Table" object types can be output with a corresponding description of the lookup table object and a check box for the user to select or deselect each lookup table object. In this page 700, any number of lookup table objects can be selected for the translation application program to apply translations to the corresponding text strings.

Figure 8:
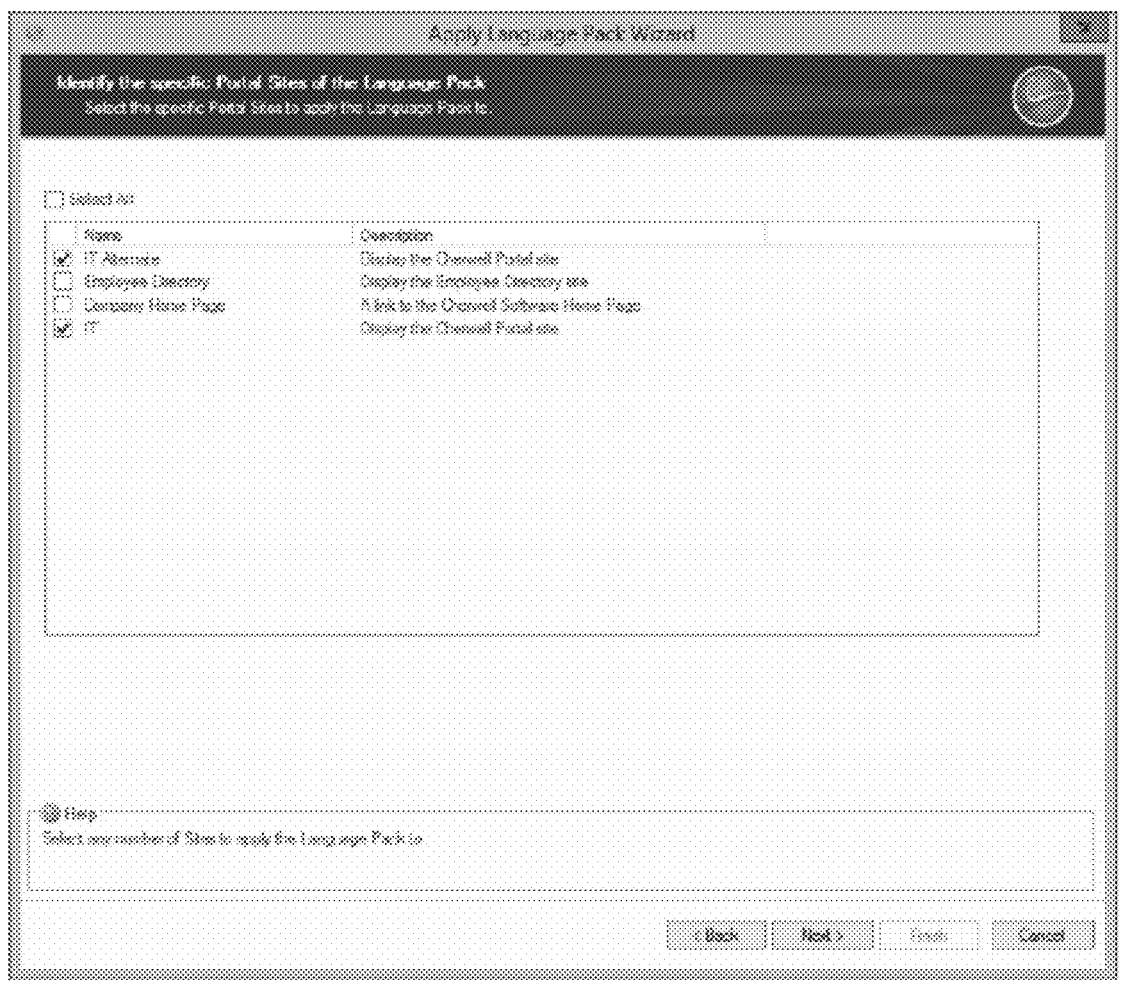

In FIG. 8, a translation application program can generate, for example, a page 800 to selectively identify specific portal site objects in the target application program to apply the language pack to. In the example shown, a column of "Portal Site" object types can be output with a corresponding description of the portal site object and a check box for the user to select or deselect each portal site object. In this page 800, any number of portal site objects can be selected for the translation application program to apply translations to the corresponding text strings.

Figure 9:
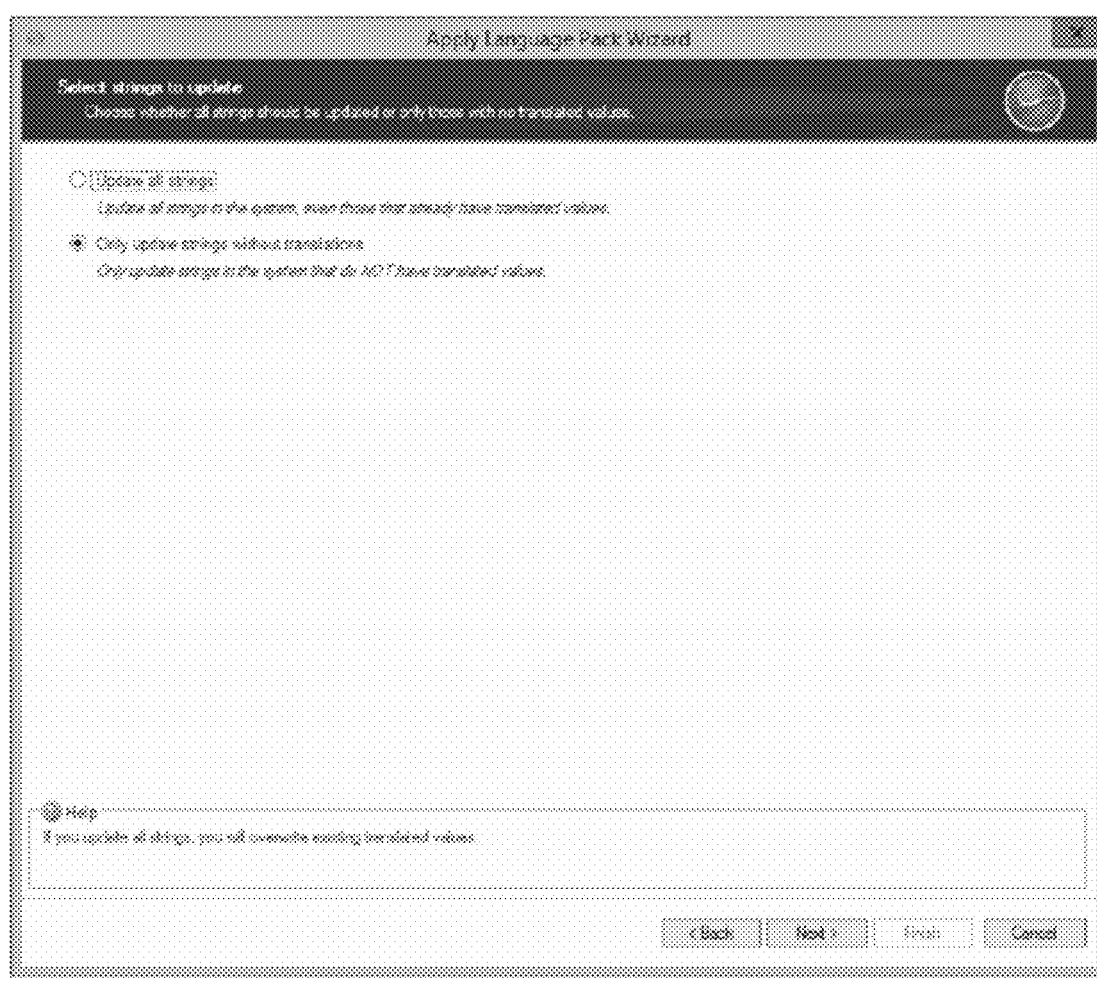

In FIG. 9, a translation application program can generate, for example, a page 900 to update all strings in a target application program, or to update strings without current translations. In certain instances, a user may want to update a portion of a target application program rather than performing a global, bulk, or relatively large scale translation of the target application from a first language to a second language.

Figure 10:
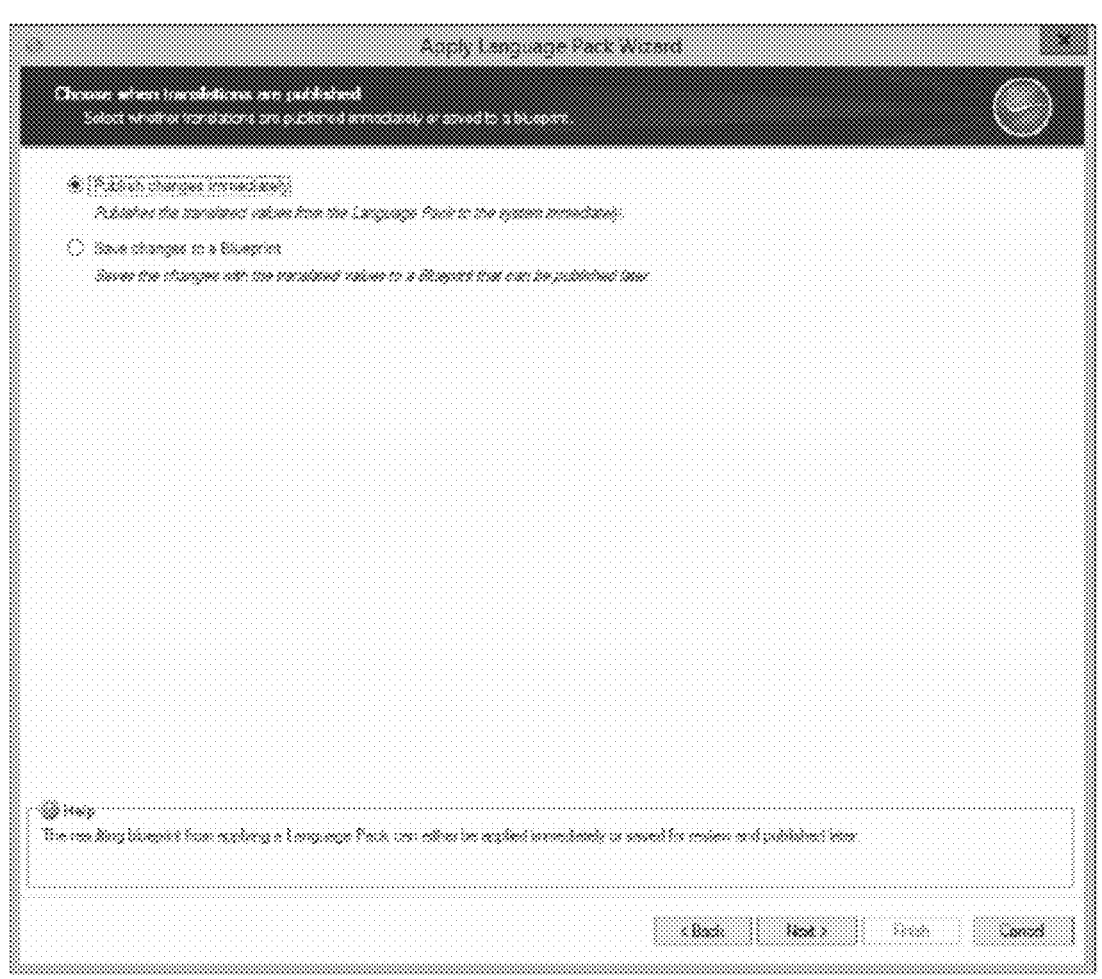

In FIG. 10, a translation application program can generate, for example, a page 1000 to publish changes immediately in a target application program, or to save changes in a blueprint or other data file in data store or other data storage device. In certain instances, a user may want to immediately implement translations to a target application program by publishing the changes, and making the changes available in the target application program. In other instance, the user may want to store the translation changes in a blueprint or data file stored in a memory, data store, or other data storage device for later retrieval and/or implementation.

Figure 11:
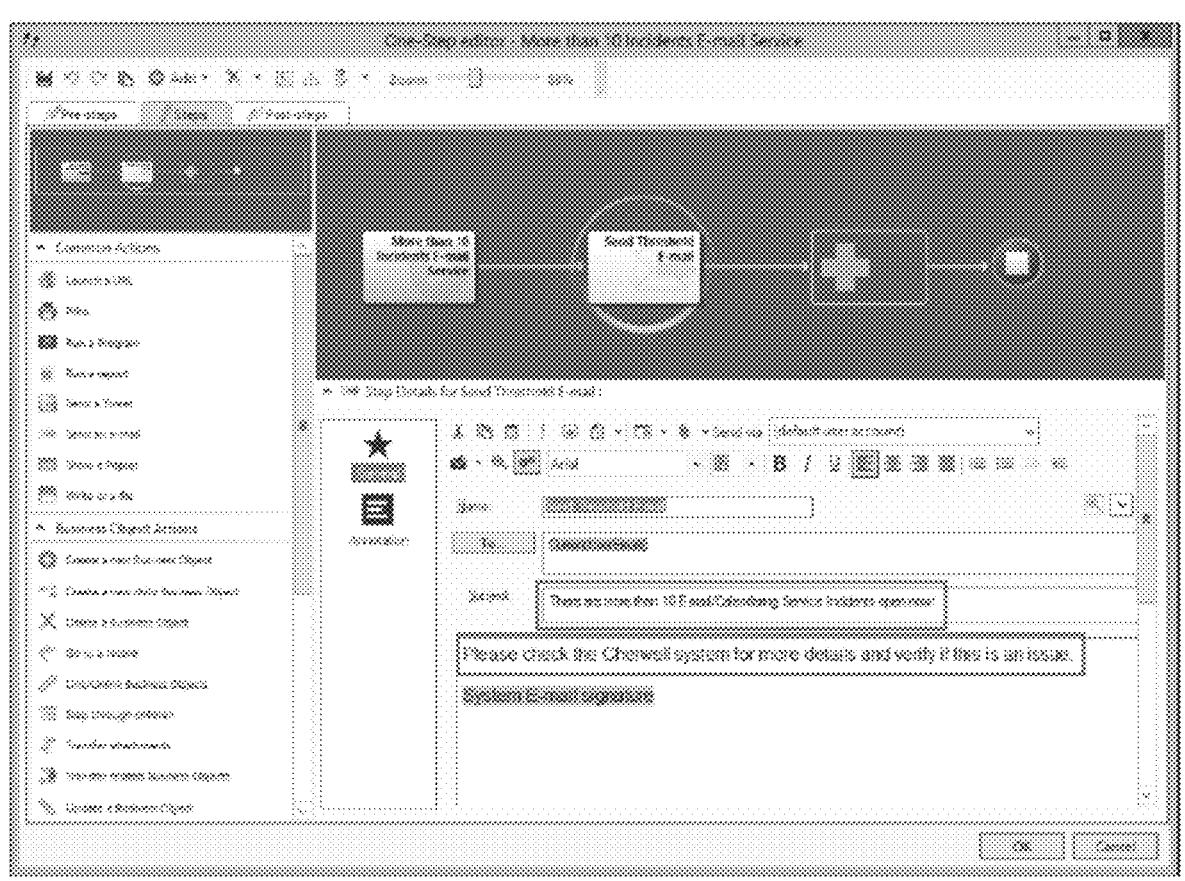

In FIG. 11, a translation application program can generate, for example, a page 1100 to permit a user to translate a particular action in a target application program, such as an email template. In the example shown, various portions or fields of an email template can be highlighted by the translation application program, and the translation application program can translate the respective text strings in each portion or field of the email template as desired, selected, or may automatically translate some or all of the template as needed.

Figure 12:

FIG. 12 illustrates an example interface 1200 for a user to designate a first language and a second language to translate a target application program.

Figure 13:
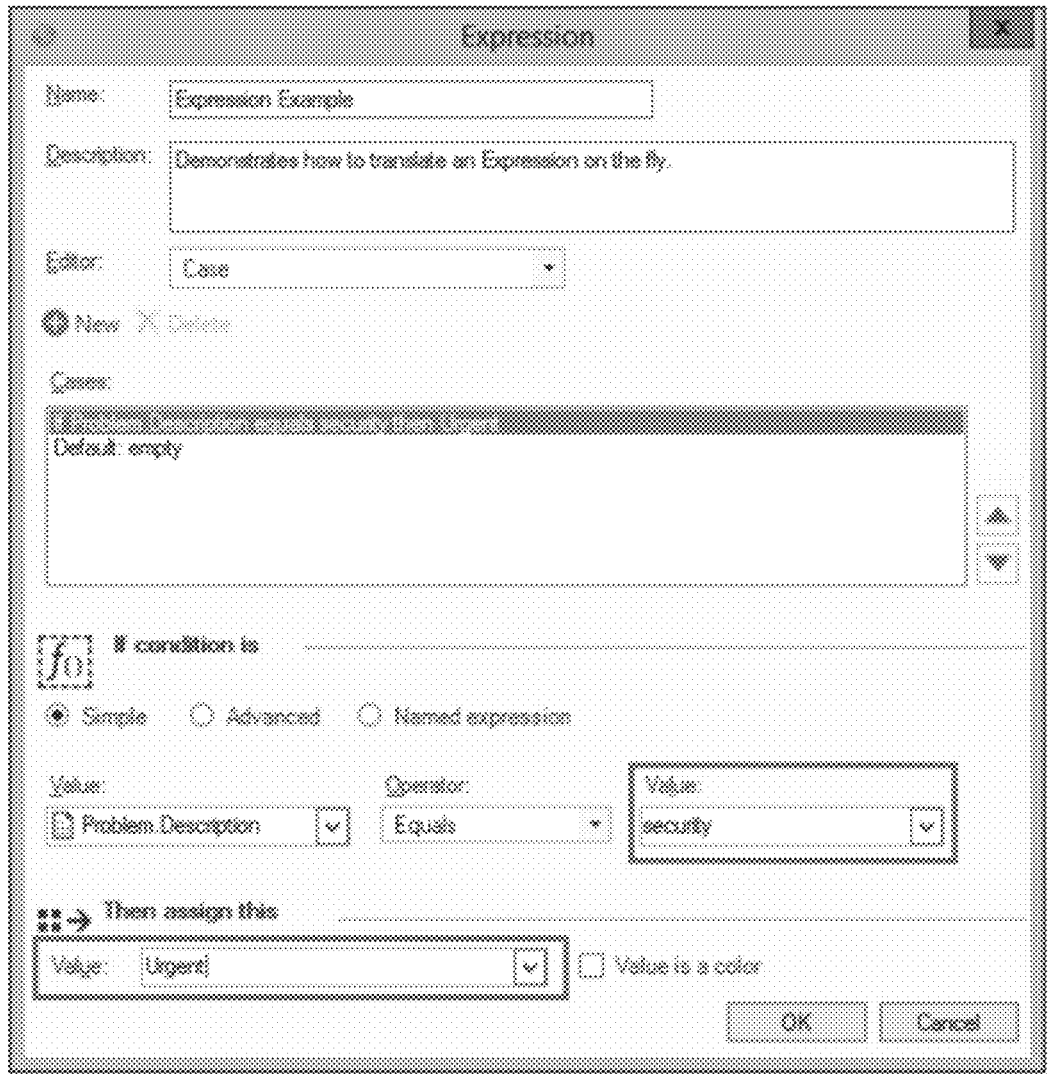

In FIG. 13, a translation application program can generate, for example, a page 1300 to permit a user to translate a particular expression in a target application program. In the example shown, various characteristics for an expression can be highlighted by the translation application program, and the translation application program can prompt the user to define certain characteristics including, but not limited to, name, description, case type, conditions, value, operator, and assignment.

Figure 14:
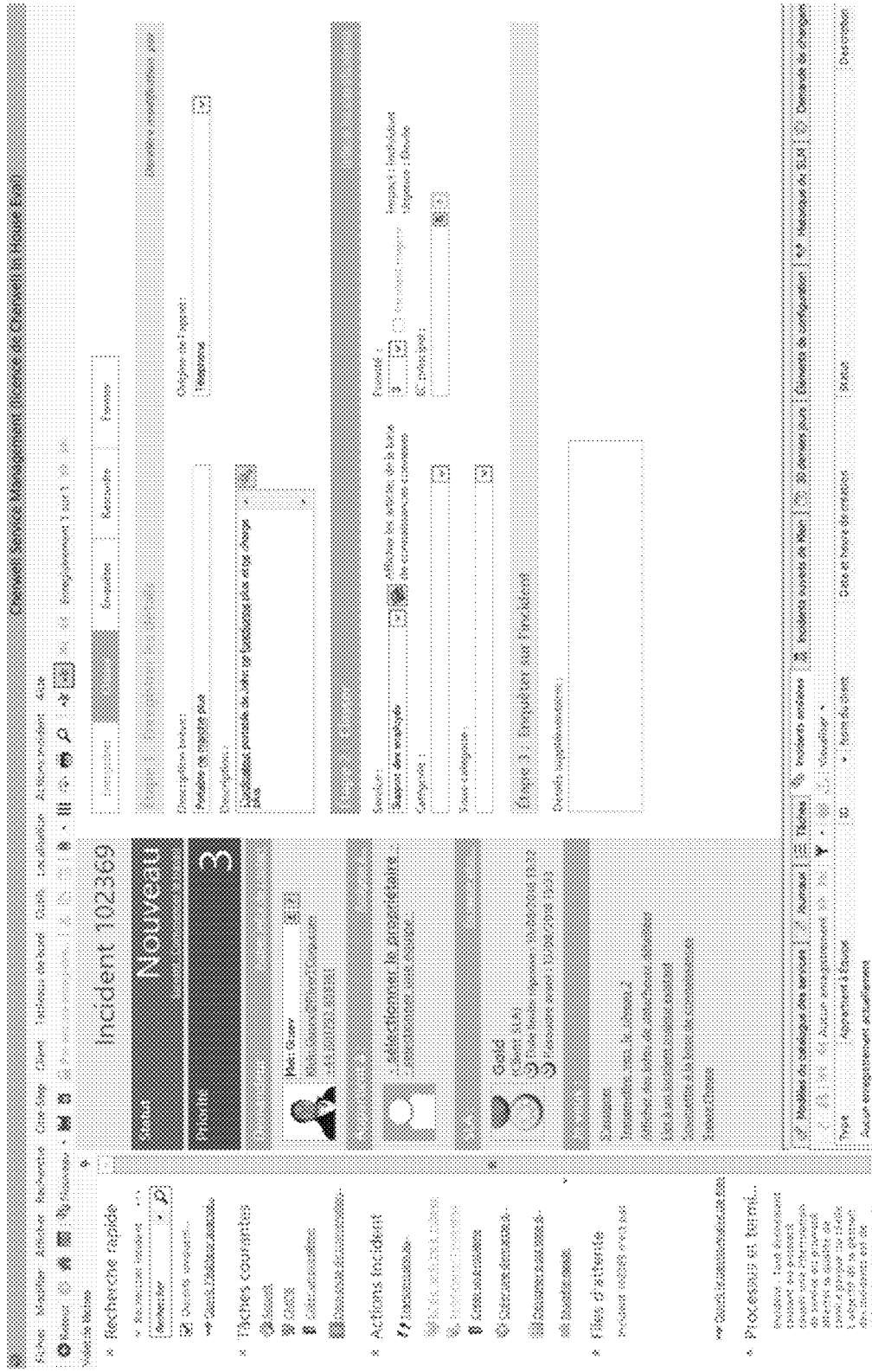

In FIG. 14, a translation application program can translate one or more text strings in a target application, and the page 1400 shown illustrates one or more translated text strings and associated content in a target application program. The example page illustrates one or more text strings and associated content translated from English to French.

Other embodiments of the disclosure can include:

A system comprising: a server device having at least one processor configured to execute computer-readable instructions stored in the memory, the computer-readable instructions operable to: receive one or more text strings written in the first language; receive an indication of a second language to convert the one or more text strings to; identify within the one or more text strings, a definition comprising at least one function written in the first language; identify, within the definition, at least one embedded function corresponding to the at least one function and written in the second language; convert, based at least in part on the at least one embedded function written in the second language, the one or more text strings to translated text strings written in the second language and comprising at least a portion of the definition; alter one more of a database schema, object definition, and/or object definition storage to facilitate localization and translation without manual input from a user; and display the translated text strings.

A further embodiment of the disclosure can include:

A system comprising: a server device having at least one processor configured to execute computer-readable instructions stored in the memory, the computer-readable instructions operable to: receive a definition comprising at least one function written in a first language; embed, within the definition, the at least one function written in a second language translatable to the first language; retrieve the at least one function written in the second language translatable to the first language; and based at least in part on the at least one function written in the second language, convert a text string from the first language to the second language, wherein the text string comprises at least a portion of the definition.

An additional embodiment of the disclosure can include:

A computer-readable medium comprising a memory with one or more computer-executable instructions operable to: receive one or more text strings written in the first language; receive an indication of a second language to convert the one or more text strings to; identify within the one or more text strings, a definition comprising at least one function written in the first language; identify, within the definition, at least one embedded function corresponding to the at least one function and written in the second language; convert, based at least in part on the at least one embedded function written in the second language, the one or more text strings to translated text strings written in the second language and comprising at least a portion of the definition; alter one more of a database schema, object definition, and/or object definition storage to facilitate localization and translation without manual input from a user; and display the translated text strings.

Yet another additional embodiment of the disclosure can include:

A computer-readable medium comprising a memory with one or more computer-executable instructions operable to: receive a definition comprising at least one function written in a first language; embed, within the definition, the at least one function written in a second language translatable to the first language; retrieve the at least one function written in the second language translatable to the first language; and based at least in part on the at least one function written in the second language, convert a text string from the first language to the second language, wherein the text string comprises at least a portion of the definition.

The disclosure is described above with reference to block and flow diagrams of systems, methods, apparatuses, and/or computer program products according to example embodiments of the disclosure. It will be understood that one or more blocks of the block diagrams and flow diagrams, and combinations of blocks in the block diagrams and the flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the invention.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-readable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
    receiving one or more text strings written in a first language, wherein a first component comprises the one or more text strings, and a second component comprises the one or more text strings, wherein the first component and the second component are within an application program;
    identifying, within the one or more text strings, a definition comprising at least one function written in the first language;
    identifying, within the definition, at least one embedded function corresponding to the at least one function and written in a second language and a third language;
    receiving a first indication of the first component to be translated to the second language;
    receiving a second indication of the second component to be translated to the third language;
    converting, based at least in part on the at least one embedded function and the first indication, the one or more text strings associated with the first component to first translated text strings written in the second language and comprising at least a first portion of the definition;
    converting, based at least in part on the at least one embedded function written and the second indication, the one or more text strings associated with the second component to second translated text strings written in the third language and comprising at least a second portion of the definition;
    altering the first component, wherein the first component comprises one or more of a database schema, object definition, and/or object definition storage to facilitate localization and translation without manual input from a user;
    altering the second component;
    displaying the first translated text strings; and
    displaying the second translated text strings.

2. The method of claim 1, wherein the first language comprises English, and the second language comprises a language other than English.

3. The method of claim 1, wherein receiving the first and second indications are from the user or the application program.

4. The method of claim 1, further comprising:
translating the at least one function from the first language to the second language; and
embedding, within the definition, the at least one function translated to the second language.

5. The method of claim 1, wherein the altering further comprises:
storing the first translated text strings in the second language in the database schema, object definition, or object definition storage.

6. The method of claim 1, further comprising:
accessing the database schema, object definition, or object definition storage to obtain the first translated text strings in the second language.

7. The method of claim 1, wherein the displaying comprises:
outputting to a display device the first translated text strings within the application program, wherein upon input of a command from the user, the input received in response to at least a portion of the first translated text strings, the application program executes the at least one embedded function.

8. The method of claim 7, wherein the at least one function facilitates a physical action by a computer executing the application program, the physical action comprising at least one of the following: printing a document, or transmitting a message or an email.

9. A computer-implemented method comprising:
receiving a definition comprising at least one function written in a first language;
embedding, within the definition, the at least one function written in a second language and a third language translatable to the first language to generate an embedded function;
retrieving the at least one function written in the second language and the third language translatable to the first language;
receiving a first indication of a first component to be translated to the second language;
receiving a second indication of a second component to be translated to the third language, wherein the first component and the second component comprise a text string written in the first language, and the first component and the second component are within an application program
based at least in part on the at least one function written in the second language and the first indication, converting the text string associated with the first component to a first translated text string written in the second language, wherein the text string associated with the first component comprises at least a first portion of the definition; and
based at least in part on the at least one function written in the third language and the second indication, converting the text string associated with the second component to a second translated text string written in the third language, wherein the text string associated with the second component comprises at least a second portion of the definition.

10. The method of claim 9, wherein the first language comprises English, and the second language comprises a language other than English.

11. The method of claim 9, wherein receiving the first and second indications from a user or the application program.

12. The method of claim 9, further comprising:
storing the first translated text string; and
storing the second translated text string.

13. The method of claim 12, wherein the first component comprises a database schema, object definition, or object definition storage, wherein the storing further comprises:
storing the first translated text string in the second language in the database schema, object definition, or object definition storage.

14. The method of claim 13, further comprising:
accessing the database schema, object definition, or object definition storage to obtain the first translated text string in the second language.

15. The method of claim 9, further comprising:
outputting to a display device the first translated text string within the application program, wherein upon input of a command from a user, the input received in response to at least a portion of the first translated text string, the application program executes the embedded function.

16. The method of claim 9, wherein the at least one function facilitates a physical action by a computer executing the application program, the physical action comprising at least one of the following: printing a document, or transmitting a message or an email.

17. A system comprising:
a server device having at least one processor configured to execute computer-readable instructions stored in a memory, the computer-readable instructions operable to:
receive one or more text strings written in a first language, wherein a first component comprises the one or more text strings, and a second component comprises the one or more text strings, wherein the first component and the second component are within an application program;
identify within the one or more text strings, a definition comprising at least one function written in the first language;
identify, within the definition, at least one embedded function corresponding to the at least one function and written in a second language and a third language;
receive a first indication of the first component to be translated to the second language;
receive a second indication of the second component to be translated to the third language;
convert, based at least in part on the at least one embedded function and the first indication, the one or more text strings associated with the first component to first translated text strings written in the second language and comprising at least a first portion of the definition;
convert, based at least in part on the at least one embedded function and the second indication, the one or more text strings associated with the second component to second translated text strings written in the third language and comprising at least a second portion of the definition;
alter the first component, wherein the first component comprises one or more of a database schema, object definition, and/or object definition storage to facilitate localization and translation without manual input from a user;
alter the second indication;
display the first translated text strings; and
display the second translated text strings.

18. The system of claim 17, wherein the computer-readable instructions are further operable to:
translate the at least one function from the first language to the second language; and
embed within the definition, the at least one function translated to the second language.

19. The system of claim 17, wherein the computer-readable instructions operable for display further comprise instructions operable to:
output to a display device the first translated text strings within the application program, wherein upon input of a command from the user, the input received in response to at least a portion of the first translated text strings, the application program executes the at least one embedded function.

20. The system of claim 17, wherein the at least one function facilitates a physical action performed by a computer executing the application program, the physical action comprising at least one of the following: printing a document, or transmitting a message or an email.

* * * * *